Nov. 18, 1969     E. H. LAND ET AL     3,479,184
MULTILAYER FILM PACK

Filed Sept. 3, 1963     2 Sheets-Sheet 1

INVENTORS
Edwin H. Land
and
Otto E. Wolff
BY Brown and Mikulka
Donald M. Sandler
ATTORNEYS

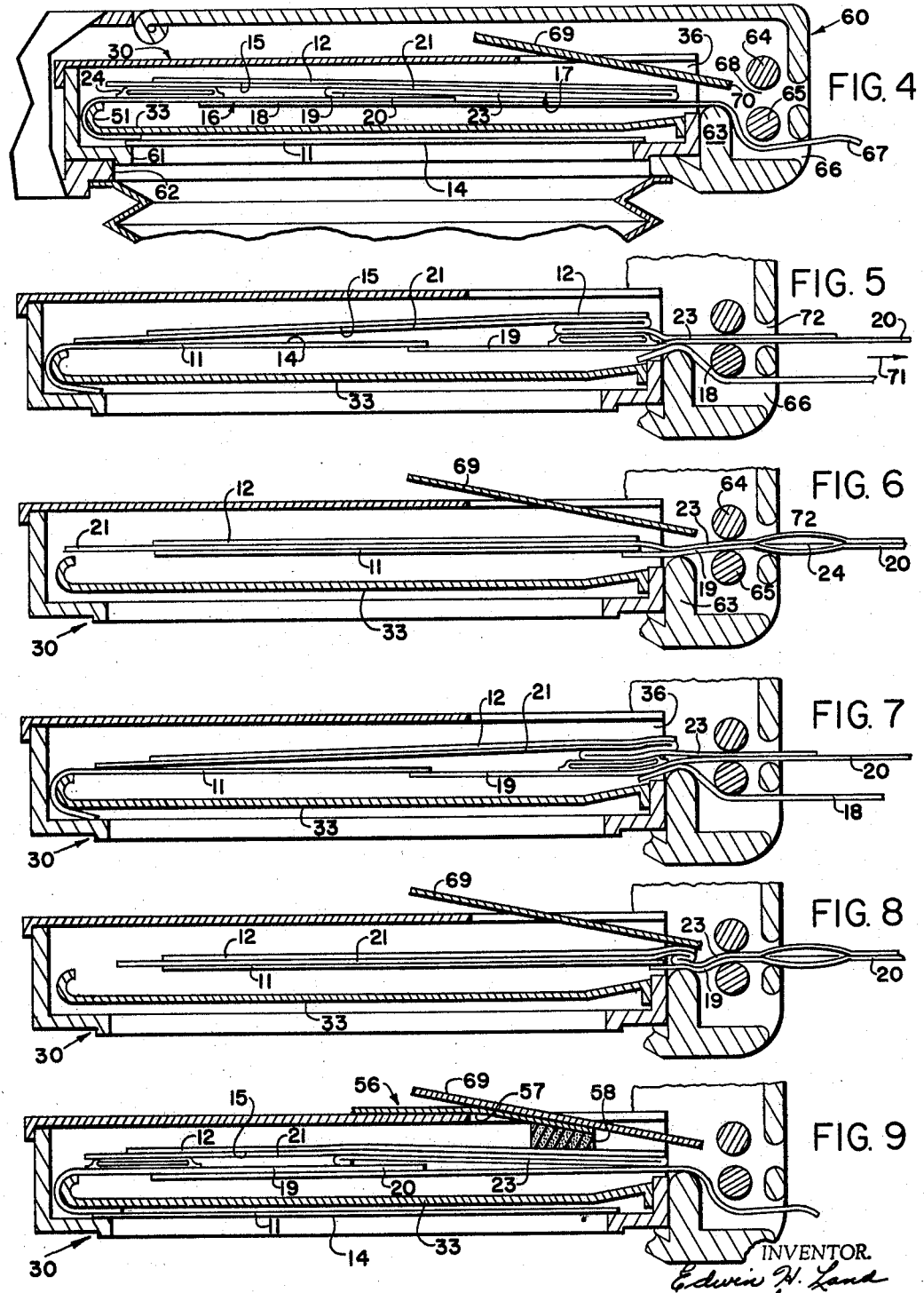

United States Patent Office 3,479,184
Patented Nov. 18, 1969

3,479,184
MULTILAYER FILM PACK
Edwin H. Land, Cambridge, and Otto E. Wolff, Wayland, Mass., assignors to Polaroid Corporation, Cambridge, Mass., a corporation of Delaware
Filed Sept. 3, 1963, Ser. No. 306,384
Int. Cl. G03c *3/00, 5/54*
U.S. Cl. 96—76    4 Claims

ABSTRACT OF THE DISCLOSURE

A photographic film package which utilizes a diffusion transfer process to form photographic images by using multilayered photographic film. The film is stored in flat rather than roll form and means are employed for controlling the movement of one layer with respect to the other film layer, said means consisting of a web between the film layers, a properly sized exit opening and a polyurethane foam block mounted on the film container.

---

This invention relates to film packages for cameras in which a diffusion transfer process is utilized to form photographic images, and more particularly to a film package wherein a plurality of multilayered photographic film units are stored in flat rather than roll form.

Film packages of the type described may take the form of a generally flat, elongated container having an exposure opening in the form of an opening in one longitudinal wall through which light from the scene being photographed can be focused, and an exit opening in the form of an opening in one transverse end through which a film unit can be withdrawn from the container subsequent to exposure for processing by the camera. Each film unit may include a negative and a positive in the form of a pair of sheets, each of which has a photographic coating on one surface; and the format may be such that the sheets are in superposed relationship with the coatings of each sheet facing in the direction of the exposure opening. A pressure plate is usually between the sheets to urge the sheet containing the image-receiving coating into a plane that coincides with the focal plane of the camera into which the film package is inserted. Web means interconnect the sheets and are cooperable with the pressure plate so that the sheet containing the image-receiving coating can be longitudinally moved relative to the container until the last-mentioned sheet is positioned in registration with and adjacent to the other sheet, with the coated surface of each facing the other. In this condition, the sheets are in what is termed contacting registration and the introduction of processing liquid between the sheets effects the transfer of the image from one sheet to the other. Such introduction takes place when both sheets are longitudinally moved as a unit through the exit opening of the container and between the bite of a pair of pressure rollers mounted on the camera. The construction may be such that initial movement of the sheets as a unit fractures a pod holding the processing liquid and attached to the film unit. Upon withdrawal of the unit from the camera, the diffusion transfer process takes place outside of the camera. To facilitate removal of the unit from the film package the exit opening of the container is made large enough to effect free longitudinal movement of the positive and negative into and through the exit opening.

One of the problems encountered with film packages of the type described is that frequently, one obtains a so-called misregistered positive containing only a portion of the image contained on the negative. In other words, part of the positive is blank. Additionally, one sometimes obtains positives wherein the image is blurred in whole or part.

It is therefore the primary object of the present invention to provide a film package of the type described which does not suffer from the defects outlined above. That is to say, it is the primary object to provide specific means for preventing the obtaining of misregistered positives, and misregistered positives that are blurred.

Briefly, the invention involves a recognition that the negative must be in contacting registration with the positive before the processing liquid is introduced between the superposed sheets if misregistered and blurred positives are to be avoided. It has been determined that the movement of the negative toward a position in contacting registration with the positive tends to longitudinally displace the positive into the exit opening. Since the latter is specifically designed to offer no impedance to such displacement of the positive in order to facilitate removal of both the positive and negative from the container, a certain amount of movement sometimes takes place. The positive obtained in such case is out of registration by the amount the positive moved during movement of the negative toward contacting registration. Sometimes, the positive and negative, while initially out of registration when the processing liquid is introduced between the sheets, move into registration while the film unit is being withdrawn from the container. This results in a blurred print since the processing liquid is already between the sheets when the movement into registration occurs. The invention resides in the provision of friction means which exerts on the positive, a longitudinal force effective to retard longitudinal movement of the positive into and through the exit opening. This frictional retardation serves to prevent movement of the positive and negative as a unit until the sheets are in contacting registration with the result that the processing liquid is introduced between the sheets only after the latter are in contacting registration.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

For a fuller understanding of the nature and objects of the invention, reference should be had to the following detailed description taken in connection with the accompanying drawings wherein:

FIGS. 4 through 9 are longitudinal side views of a film container inserted in a camera and holding a single film unit for the purpose of showing the relative positions of the components of the latter as the unit is withdrawn from the container and camera.

Figure 1:
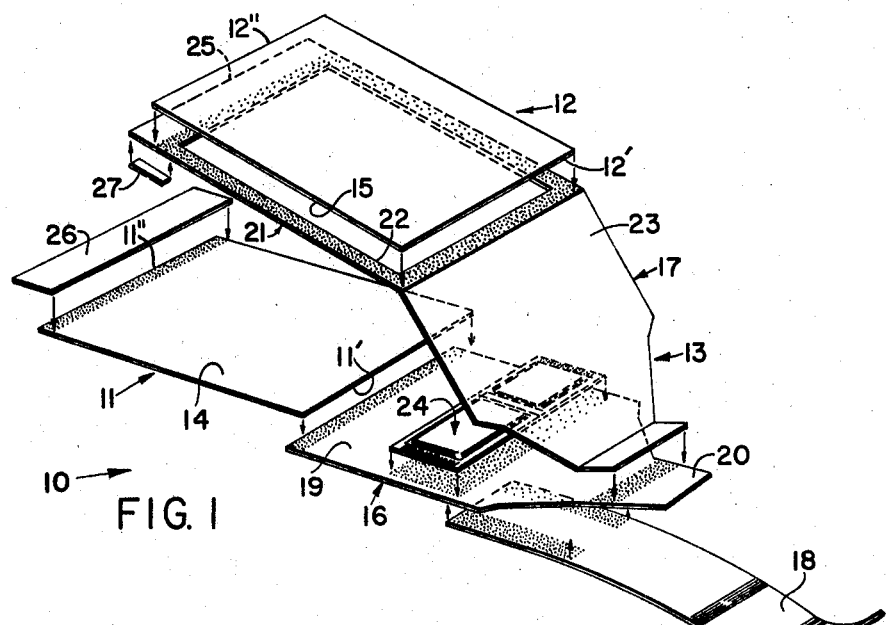
FIGURE 1 is a perspective view of a film unit showing the places at which the various components are attached.

Referring now to FIGURE 1, a film unit is shown in perspective in order to better illustrate the component parts and the manner in which the latter are interconnected. Basically, the film unit designated by reference numeral 10 includes negative 11, positive 12 and web means 13 interconnecting the two. Negative 11 has image-receiving coating 14 on one surface and positive 12 has image-producing coating 15, both coatings being termed photographic coatings for convenience. Web means 13 includes negative leader 16, positive leader 17 and pull tab 18. Negative leader 16 includes pod-holder portion 19 attached to the leading edge 11' of negative 11, and pull portion 20 at the end of the leader remote from the end to which the negative is attached. The width of pull portion 20 is somewhat reduced to facilitate its threading between the bite of the pressure rollers as will be explained later.

Positive leader 17 includes mask portion 21 provided with rectangular aperture 22 attached to the coated surface 15 of positive 12 for defining the picture area of the positive. In addition, leader 17 includes connector portion 23 by which the leading edge 12' of the positive is connected to the surface of pull portion 20 of the negative leader that faces in the same direction as the coated surface of the negative. As a consequence, connector portion 23 of the positive leader can be folded over pod-holder portion 19 of the negative leader to permit the coated surfaces of the positive and negative to face each other. The lengths of portions 19 and 23 are such that the positive and negative are in contacting registration, which is to say that the latent image on the negative can be transferred to the positive completely filling the area defined by opening 22.

The remaining part of web means 13 is pull tab 18 which is releasably attached to the surface of negative leader that faces in the opposite direction to the coating on negative 11. Film unit 10 also includes frangible pod 24 containing the processing liquid for effecting the diffusion transfer process and attached to the same surface of leader portion 19 as connector portion 23. The remaining parts of the film unit include a skirt on extension 25 to mask 21 attached to the trailing edge 12" of the positive, and extension 26 attached to the trailing edge 11" of the negative. In cooperation with rails 27 attached to extension 25 and facing in the same direction as the coating on the positive, the extensions 25 and 26 serve as a reservoir to capture and retain excess processing fluid that would otherwise be extruded at the trailing edge of the film unit as the latter is withdrawn from the camera.

Figure 3:
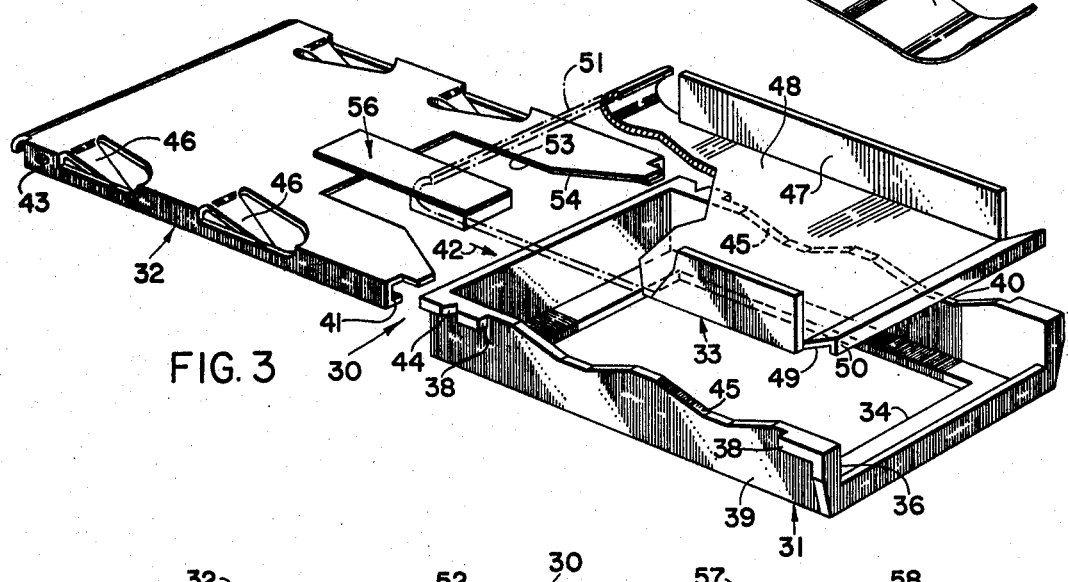
FIG. 3 is a perspective view of the three elements that make up the container.
Figure 2:
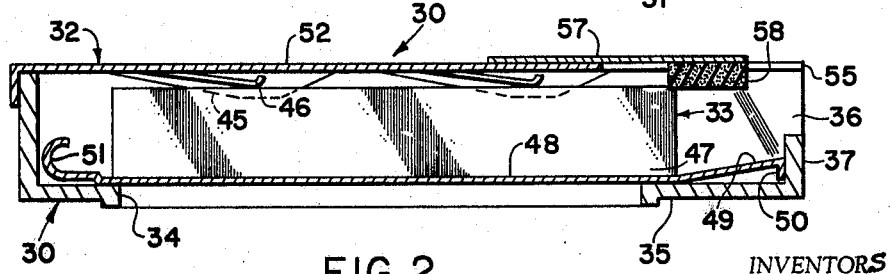
FIG. 2 is a longitudinal side view of the film container in section.

The positioning of the film unit in the film container designated by reference numeral 30 and shown in section in FIG. 2, and an perspective in FIG. 3, can best be understood by first considering the construction of the container. Container 30 includes main housing 31, top 32 and pressure plate 33, and is essentially a generally flat elongated body having an exposure opening therein in the form of opening 34 in longitudinal flat wall 35 through which light from the scene being photographed can be focused; and an exit opening in the form of opening 36 in transverse end wall 37 through which a film unit can be withdrawn from the container subsequent to exposure for processing. Housing 31 defines longitudinal wall 35 and transverse wall 37 of the container. Lugs 38 on the upstanding longitudinal walls 39 and 40 are cooperable with inturned flanges 41 on top 32 such that the latter can be slid longitudinally onto the housing in the direction of arrow 42 (FIG. 3) to define longitudinal wall 52 of the container opposite to wall 35. Detent 43 in top 32 is engageable with recess 44 in one of the lugs 38 to securely retain the top on the housing.

Sides 39 and 40 of the housing are provided with spring receiving notches 45 into which spring tabs 46 punched from the top extend when the latter is locked in position. Tabs 46 have considerable width and project into the interior of the housing and into engagement with the top edge of upstanding longitudinal walls 47 of pressure plate 33 which are positioned adjacent to walls 39 and 40 of the housing when the plate is inserted thereinto. Spring tabs 46 urge negative engaging face 48 of the plate toward wall 35 as shown in FIG. 2. At one end of face 48 is extension 49 projecting at an inclination to the plane of face 48 and terminating in an upturned flange 50 that abuts wall 37 when the plate is inserted in the housing.

At the other end of face 48 is a rounded guide 51. The assembled container shown in FIG. 2 contains no film units, however, and face 48 rests against wall 35 urged there by springs 46. Guide 51 is slightly spaced from the transverse wall opposite to wall 37 film unit when the latter is inserted into the container.

The longitudinal surface 52 of the container defined by top 32 is provided, at the end adjacent wall 37, with a relieved portion defined by rectangular cut-out 53 that merges with trapezoidal cut-out 54 at the transverse edge 55 of the top adjacent exit opening 36. Openings 53–54 are provided for clearance needed by auxiliary apparatus (not shown in FIG. 2) attached to the camera for the purpose of engaging one of the sheets of the film unit as the latter is drawn between the bite of the pressure rollers and controlling the transverse flow of the processing liquid between the sheets of the film unit. Such auxiliary apparatus is shown in more detail in application Ser. No. 268,882, filed Mar. 29, 1963, now U.S. Patent No. 3,165,039, and application Ser. No. 299,787, filed Aug. 5, 1963, now U.S. Patent No. 3,241,468. The above-described container is conventional and the improvement therein is positive-holder 56 which takes the form of a deformable member 57 suitably attached to surface 52 and centered in opening 53, projecting thereinto, but terminating short of edge 55. At the free end of member 57 remote from the end attached to surface 52 is a block of frictional material 58 suitably attached to the surface of member 57 facing wall 35. Material 58 is ideally one that exerts a substantial frictional force under light normal loads and, at the present time, is preferably polyurethane foam, although it should be understood that there are apparently many suitable materials. The chief advantage of a foamed plastic of this nature is the fact that its density can be closely controlled to give suitable results and the holder can be fashioned by the conventional process of coating one end of member 57 with the raw plastic and then curing the coating to produce a foamed block, thus eliminating the necessity to bond the block to the member.

To understand the results achieved by the use of positive-holder 56, a description of the operation of a film package without such a holder will be helpful. Therefore, reference is now made to FIGS. 4 through 8 which shows a sequence of events yielding properly and improperly printed positives. In FIG. 4 container 30 has been inserted into a camera of the type described and designated by numeral 60 so that the inner surface of wall 38 is coplanar with the focal plane of the camera. Upstanding lips 61 defining opening 34 cooperate with opening 62 in the camera to correctly align the container relative to the optical axis of the camera. A single film unit like that shown at 10 in FIGURE 1 is shown inserted in the container, it being understood that the drawing is limited to a single unit to facilitate illustration of the operation of the device, although in practice the container would have a plurality of film units therein. The format is such that the coating on surface 14 of negative 11 faces in the same direction as the coating on surfaces 15 of positive 12, and the negative and positive are in superposed relationship. Pressure plate 33 is between the negative and the positive and the plate urges the image-forming coating of negative 11 into the focal plane of the shutter independently of exerting any bias on the positive. Web means 13 interconnects the negative with the positive. Thus, portion 23 of positive leader 17 is folded back onto portion 21 thereof and extends longitudinally from the leading edge of the positive toward the trailing edge thereof. Portion 19 of negative leader 16, connected to the remote end of portion 23, extends longitudinally toward the transverse wall on container 30 that is opposite wall 37, curving 180° around guide 51. Portion 20 of leader 16 extends toward the opening 36. Pull tab 18 extends through opening 36 and over guide 63 on the camera that is adjacent wall 37 and serves to narrow slightly the exit opening through which the film units are withdrawn. Tab 18 continues to one side of the pressure rollers 64 and 65 and through tab opening 66 in the transverse end of the camera. Free end 67 of tab 18 is thus outside the camera and can be grasped and pulled by an operator to achieve the first step in removing the film as shall be explained later.

It should be noted that the plane passing parallel to the focal plane of the camera and through the space 68 defining the bite of rollers 64 and 65 lies within opening 36 as defined by the edge of guide 63. Furthermore, tab 18 passing over guide 63 causes portion 20 of web means 13 to be guided into space 68 upon longitudinal displacement of the attached end of the tab toward opening 36. The auxiliary apparatus referred to above as controlling the transverse spreading of the processing liquid is shown schematically at 69, it being a spring loaded member urged toward guide 63 and cooperable therewith to achieve control of the transverse spread of the processing liquid. FIG. 4 also shows how the openings 53-54 in top 32 permit the free edge 70 of member 69 to be correctly positioned relative to the guide and the opening 68 and still maintaining the proper inclination relative to the plane of the film unit as the latter is drawn between the bite of rollers 64 and 65.

After an operator has caused surface 14 to be exposed by operating a shutter mechanism (not shown) the film unit is withdrawn from the camera for processing external thereto in two distinct steps. For the first step, the operator grasps free end 67 of tab 18 and sharply pulls in the direction of arrow 71 in FIG. 3. Web means 13 interconnecting the positive and negative cooperates with pressure plate 33 to cause the longitudinal movement of the end of tab 18, releasably attached to portion 19 of leader 16, to impart a simultaneous longitudinal movement to leader 16. Such movement pulls negative 11 180° around guide 51 until at least a portion of surface 14 on negative 11 faces surface 15 on the positive; causes portion 20 of leader 16 to extend through bite 68 of rollers 64 and 65 and pass outwardly through opening 72 in the transverse end face of the camera adjacent opening 66; and causes portion 23 of leader 17 to fold under itself as shown best in FIG. 5. This longitudinal movement continues until the resistance to such movement is greater than the shear resistance of the releasable connection between tab 18 and portion 19. Thus FIG. 5 shows the relative positions of the various elements of the film package just as the tab separates from the leader. It should be noted that exit 36 is of such size and so located as to effect longitudinal movement of portions 19 and 20 of leader 17, tab 18 prior to separation serving to guide portion 28 through bite 68. In fact, exit 36 is designed to effect longitudinal movement of the positive and the negative without impediment into and through the bite, which is the second step, the initial part of which is shown in FIG. 6.

Since portion 20 is external to the camera, the operator can now grasp such portion sharply pulling it in the direction of arrow 71. The negative, being directly connected to portion 20 by portion 19, moves with portion 20 and the initial longitudinal displacement of portion 20 causes portion 23, folded upon itself as shown in FIG. 5, to unfold completely as shown in FIG. 6 such that the negative is moved into contacting registration with the positive, and leader portions 19 and 23 are superposed. Simultaneously, pod 24 passes between rollers 64 and 65, is fractured, and releases processing fluid between the two superposed portions 19 and 23. At this point, the positive is directly connected to portion 20 by portion 23, and further displacement of portion 20 draws the two sheets in contacting registration as a unit through space 68 between rollers 64 and 65 until the unit is removed from the film package and the camera as well. During such further displacement, edge 70 of member 69 cooperable with guide 63 controls the transverse flow of processing liquid between the superposed registered positive and negative to achieve the proper distribution.

Unfortunately, the fact that exit 36 freely effects longitudinal movement of the positive and negative as a unit apparently gives rise to the problem illustrated in FIGS. 7 and 8. Thus, the positive is not constrained against longitudinal movement during the first step above described (namely, the displacement of portion 20 external to the camera, which is accompanied by the longitudinal displacement of the negative until the coating thereon faces the coating on the positive) since any protruberance in the exit opening to prevent movement of the positive will adversely interfere with the second step by which the unit is withdrawn from the camera. It has been determined that the movement of the negative toward its position in contacting registration with the positive tends to urge the positive in the same direction as the direction in which portion 20 moves. This effect is illustrated in FIG. 7, which shows the relative position of the components after the completion of the first step during which the negative was moved toward contacting registration. That is to say, tab 18 has just broken loose from portion 19; portion 20 occupies the same extended position as shown in FIG. 5; portion 23 is folded over on itself; but the positive has been moved by the frictional drag of portion 23 on portion 21 to which the positive is bonded, and now extends well into opening 36. Thus, from external conditions, namely the amount of leader 20 exposed to an operator's view, it cannot be ascertained whether the positive occupies the correct position at the end of the first step as shown in FIG. 5 or the incorrect position as shown in FIG. 7.

When the second step is performed, namely the grasping of portion 20 and its sharp withdrawal, the initial movement does not cause portion 23 to completely unfold as shown in FIG. 6. Instead, the negative, while in superposed relation to the positive, is not registered therewith (see FIG. 8). Further displacement of portion 23 can cause either or both of two things to happen: (1) leader 23 remains folded upon itself as the unit is withdrawn with the result that a considerable portion of the latent image on the negative will not be transferred to the positive; and (2) leader 23 will unfold on passing between the pressure rollers causing relative movement between the positive and the negative while the processing fluid is present, with the result that the positive will be blurred.

The amelioration of this situation is achieved by positive-holder 56 shown in FIG. 9 which extends into cutouts 53 and 54 as indicated. Member 57 is deformed by auxiliary apparatus 69 so that block 58, that normally just engages the surface of the positive reverse to the surface having coating 15 when the container is filled to capacity, is pressed down into frictional engagement with the positive. It has been found that the pull on tab 18 tends to cause the positive to be pushed into tighter engagement with the block during the first step by which portion 20 is exposed for the operator to grasp. As a result, the normal force exerted between the block and the positive creates a longitudinal frictional force that resists incipient longitudinal movement of the positive during the first step. It should be noted that the inclination of apparatus 69 relative to the plane of the positive is so slight that the tendency of the positive to move longitudinally is not counteracted by a tendency of apparatus 69 to cam the postive in the opposite direction.

Even if member 56 cannot consistently prevent entirely the longitudinal movement of the positive during the first step such that the relative position of the components resembles that shown in FIG. 8, block 58 is effective to retard such longitudinal movement during the second step wherein portion 20 is grasped and pulled outwardly. Under the last-mentioned condition, block 58 will hold the positive as the negative continues to move until the sheets are in contacting registration and prior to the introduction of processing liquid between the superposed photosensitive coatings. Instead of attaching the friction device to the film package, a friction block could alternatively be attached to the member 69.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photographic film package comprising:

a generally flat elongated container having an exposure opening in one flat wall and an exit opening at one transverse end;

a pair of sheets, each having a photographic coating on one surface, longitudinally arranged in said container with the surfaces having the coating being out of contacting registration and at least a single sheet of the pair being operatively associated with said exposure opening and adapted to be exposed to light transmitted through said exposure opening;

web means interconnecting said sheets including manually operable means by which one of said sheets can be moved longitudinally toward a position in contacting registration with the other of said sheets;

said exit opening being of such size and so located relative to the other of said sheets as to effect longitudinal movement thereof during longitudinal movement of said one sheet toward said position;

friction means including a member formed of polyurethane foam having a relatively high coefficient of friction; and means mounting said friction means on said container in engagement with said other sheet.

2. A photographic film package as defined in claim 1 wherein said container has an opening in the flat wall opposite the one having the exposure opening and adjacent said exit opening and said container includes a deformable member projecting longitudinally into the opening in said opposite flat wall and said friction means is mounted on said member in engagement with said other sheet.

3. A photographic film package comprising:

a generally flat elongated container having an exposure opening in one flat wall and an exit opening in one transverse end;

a pair of sheets, each having a photographic coating on one surface, longitudinally arranged in said container in superposed relationship so that the photosensitive surface of each sheet faces in the direction of said exposure opening and one of said sheets is operatively associated with said exposure opening and is adapted to be exposed to light transmitted through said exposure opening;

web means interconnecting said sheets including a tab extending through said exit opening, and being constructed and arranged so that pulling said tab outwardly through said exit opening moves said one sheet to a first position at which at least a portion of the coating thereon faces the coating on the other sheet;

friction means including a member formed of polyurethane foam having a relatively high coefficient of friction; and means mounting said friction means on said container in engagement with said other sheet.

4. A photographic film package as defined in claim 3 wherein said web means includes a pull portion interior to said container constructed and arranged such that movement of said one sheet to said first position causes said pull portion to project out of said exit opening, said web means being further constructed and arranged so that pulling said pull portion outwardly through said exit opening first moves said one sheet toward contacting registration with said other sheet and then moves both sheets as a unit outwardly through said exit opening, said friction means being effective to restrain said other sheet against motion during movement of said one sheet into contacting registration with said other sheet and then permit both of said sheets to move as a unit.

References Cited
UNITED STATES PATENTS 3,294,538   12/1966   Downey _____ 96—76

GEORGE F. LESMES, Primary Examiner

M. B. WITTENBERG, Assistant Examiner

U.S. Cl. X.R.

95—13; 96—29; 206—74

UNITED STATES PATENT OFFICE
CERTIFICATE OF CORRECTION

Patent No. 3,479,184                              November 18, 1969

Edwin H. Land et al.

It is certified that error appears in the above identified patent and that said Letters Patent are hereby corrected as shown below:

Column 4, line 59, "surfaces" should read -- surface --. Column 5, line 23, "maintaining" should read -- maintain --; line 52, "28" should read -- 20 --. Column 6, line 65, "postive" shou read -- positive --. Column 8, after line 37, insert the followi

| | | | |
|---|---|---|---|
| 342,101 | 5/1886 | Hoyt ------------------ | 206-57 |
| 1,603,714 | 10/1926 | Rappleye -------------- | 206-57 |
| 2,497,816 | 2/1950 | Greenhalgh et al. ----- | 96-29 |
| 3,002,437 | 10/1961 | Eloranta -------------- | 95-13 |
| 3,047,387 | 7/1962 | Land ------------------ | 95-13 |
| 3,087,399 | 5/1963 | Fairbank -------------- | 95-13 |
| 3,143,950 | 8/1964 | Elliot et al. --------- | 95-89 |

Signed and sealed this 27th day of October 1970.

(SEAL)
Attest:

EDWARD M. FLETCHER, JR.                      WILLIAM E. SCHUYLER, JR.
Attesting Officer                               Commissioner of Patents